United States Patent [19]

Liubakka et al.

[11] Patent Number: 5,402,341
[45] Date of Patent: Mar. 28, 1995

[54] METHOD AND APPARATUS FOR FOUR WHEEL STEERING CONTROL UTILIZING TIRE CHARACTERISTICS

[75] Inventors: Michael K. Liubakka, Livonia; Lenard J. Duchnowski, Saline; Thomas G. Reichenbach, Livonia, all of Mich.

[73] Assignee: Ford Motor Company, Dearborn, Mich.

[21] Appl. No.: 866,771

[22] Filed: Apr. 6, 1992

[51] Int. Cl.⁶ .............................................. B62D 5/04
[52] U.S. Cl. ............................... 364/424.05; 180/79.1; 180/140
[58] Field of Search ....................... 364/424.05, 426.01, 364/426.02, 426.03; 180/140, 141, 142, 143, 179.1; 280/91

[56] References Cited

U.S. PATENT DOCUMENTS

| | | | |
|---|---|---|---|
| 4,412,594 | 11/1983 | Furukawa et al. | 180/140 |
| 4,441,572 | 4/1984 | Ito et al. | 180/140 |
| 4,645,025 | 2/1987 | Ohe et al. | 180/79.1 |
| 4,657,102 | 4/1987 | Kanazawa et al. | 180/140 |
| 4,679,809 | 7/1987 | Ito et al. | 280/91 |
| 4,690,431 | 9/1987 | Ito et al. | 280/771 |
| 4,706,771 | 11/1987 | Kawabe et al. | 180/142 |
| 4,706,979 | 11/1987 | Kawabe et al. | 280/91 |
| 4,718,685 | 1/1988 | Kawabe et al. | 280/91 |
| 4,767,588 | 8/1988 | Ito | 364/424 |
| 4,768,603 | 9/1988 | Sugiyama et al. | 180/140 |
| 4,773,012 | 9/1988 | Ito et al. | 364/424.01 |
| 4,792,007 | 12/1988 | Abe et al. | 180/140 |
| 4,828,064 | 5/1989 | Furutani et al. | 180/140 |
| 4,834,204 | 5/1989 | Ito et al. | 180/140 |
| 4,840,389 | 6/1989 | Kawabe et al. | 280/91 |
| 4,842,089 | 6/1989 | Kimbrough et al. | 180/79.1 |
| 4,865,146 | 9/1989 | Ohe | 180/79.1 |
| 4,901,811 | 2/1990 | Uno et al. | 180/140 |
| 4,934,474 | 6/1990 | Sugasawa | 180/140 |
| 4,936,401 | 6/1990 | Baraszu et al. | 180/79.1 |
| 4,939,653 | 7/1990 | Tsurumiya et al. | 364/424.05 |
| 4,942,532 | 7/1990 | Mori | 364/424.05 |
| 4,947,326 | 8/1990 | Mori et al. | 364/424.05 |
| 4,953,652 | 9/1990 | Ohmura et al. | 180/140 |
| 4,964,481 | 10/1990 | Sano et al. | 180/140 |
| 4,979,115 | 12/1990 | Takahashi | 364/424.05 |
| 4,998,201 | 3/1991 | Mori | 364/424.05 |
| 5,003,480 | 3/1991 | Mori et al. | 364/424.05 |
| 5,007,494 | 4/1991 | Ohmura et al. | 180/79.1 |
| 5,010,488 | 4/1991 | Ohshita et al. | 364/424.05 |
| 5,014,801 | 5/1991 | Hirose | 180/140 |
| 5,018,594 | 5/1991 | Takahashi et al. | 180/140 |
| 5,019,982 | 5/1991 | Furukawa | 364/424.05 |
| 5,020,619 | 6/1991 | Kanazawa et al. | 180/140 |
| 5,048,629 | 9/1991 | Abe et al. | 180/140 |
| 5,076,597 | 12/1991 | Korekane et al. | 280/91 |
| 5,083,627 | 1/1992 | Kawamoto et al. | 180/79.1 |
| 5,099,938 | 3/1992 | Watanabe et al. | 180/140 |
| 5,099,940 | 3/1992 | Imaseki et al. | 180/140 |
| 5,166,254 | 5/1992 | Sano et al. | 180/140 |
| 5,268,841 | 12/1993 | Mouri | 364/424.05 |

FOREIGN PATENT DOCUMENTS

63-8075 1/1988 Japan.

OTHER PUBLICATIONS

Four Wheel Steering: Maneuverability and High Speed Stabilization, SAE #880642, John C. Whitehead, Feb. 29–Mar. 4, 1988.

Primary Examiner—Kevin J. Teska
Assistant Examiner—Collin W. Park
Attorney, Agent, or Firm—Roger L. May; Raymond L. Coppiellie

[57] ABSTRACT

A method and system is provided for improving vehicle handling during vehicle operation in the nonlinear region of the front tires for use with a vehicle (10) having manually operable front steerable wheels (12) and electronically controlled rear steerable wheels (14). The method includes the step of calculating a desired rear steer angle based on vehicle parameters, such as vehicle speed and front wheel angle. Preferably, the method also includes the steps of determining if the vehicle is operating in the nonlinear region of the front tires, calculating a handling term if the vehicle is operating in the nonlinear region of the front tires and modifying the desired rear steer angle based on the handling term. The rear steerable wheels are then steered toward the modified desired rear steer angle.

11 Claims, 17 Drawing Sheets

Lateral Tire Characteristics and Linear Approximation

METHOD AND APPARATUS FOR FOUR WHEEL STEERING CONTROL UTILIZING TIRE CHARACTERISTICS

TECHNICAL FIELD

The present invention is related to a four wheel steering system for use on a vehicle having front and rear steerable wheels.

BACKGROUND ART

Four wheel steering systems for use with motor vehicles having front and rear steerable wheels are known in the art. Typically, the front steerable wheels are manually controlled by the vehicle operator and the rear steerable wheels, mechanically or electronically are controlled, in response to the position of the front wheels and other vehicle operating parameters, such as vehicle speed. By adjusting the rear steerable wheels, vehicle handling can be improved.

U.S. Pat. Nos. 4,441,572, 4,645,025, 4,679,809 and 4,901,811 relate to four wheel steering systems wherein the steering angle of the rear wheels is determined based on parameters, such as sensed vehicle speed, front and-/or rear wheel steering angles and the like. Specifically, the '811 reference discloses a vehicle steering system for adjusting tire characteristics. The vehicle comprises front wheels, each being equipped with a front tire; and rear wheels, each being equipped with a rear tire having a rear tire characteristic which is different from the front tire characteristic. The vehicle also comprises a rear wheel steering system for steering the rear wheels and controlling means for adjusting the rear tire characteristic by steering the rear wheels in a predetermined first cornering condition of the vehicle.

U.S. Pat. Nos. 4,412,594, 4,690,431, 4,718,685 and 5,019,982 relate to four wheel steering systems wherein the rear steering angle is determined based on inputs including a signal representative of an actual vehicle motion variable, such as yaw rate or lateral acceleration. More particularly, the '982 reference discloses a method of controlling the rear wheels of a four wheel steering vehicle having front road wheels which can be turned by steering action, rear wheels which can be turned in response to the turning of the front wheels and means for detecting lateral acceleration applied to the vehicle. This arrangement allows for variable control of the steer angle ratio of a rear steer angle relative to a front steer angle based on the lateral acceleration.

U.S. Pat. Nos. 4,865,146 and 5,014,801 disclose a four wheel steering system wherein the rear steering angle is calculated based on vehicle parameters, such as steering torque, and U.S. Pat. No. 4,936,401, assigned to the assignee of the present invention, discloses a system for steering front and rear steerable wheels of a vehicle.

SUMMARY OF THE INVENTION

It is an object of the present invention to provide a method and apparatus for improving the handling of a vehicle having a four wheel steering system for controlling front and rear steerable wheels, each of which includes a tire, during vehicle operation in the non-linear region of the tires.

It is another object of the present invention to provide a method and apparatus for four wheel steering that does not utilize feedback of vehicle parameters, such as yaw rate and lateral acceleration.

In carrying out the above objects and other objects and features of the present invention, a method of improving vehicle handling is provided for use with a vehicle having manually operable front steerable wheels and electronically controlled rear steerable wheels. The method comprises the steps of calculating a desired rear steer angle based on vehicle speed and front wheel angle and determining if the vehicle is operating in the nonlinear region of the front tires. The method also comprises the steps of calculating a handling term if the vehicle is operating in the nonlinear region of the front tires, modifying the desired rear steer angle based on the handling term and steering the rear steerable wheels toward the modified desired rear steer angle.

The advantages accruing to the present invention are numerous. For example, vehicle handling in the nonlinear region of the tires is improved, making the vehicle more responsive and predictable. Additionally, since yaw rate is not utilized, fewer sensors are required, increasing reliability and decreasing cost.

The above objects and other objects, features, and advantages of the present invention will be readily appreciated from the following detailed description of the best mode for carrying out the invention when taken in connection with the accompanying drawings.

BEST MODE FOR CARRYING OUT THE INVENTION

Figure 1:
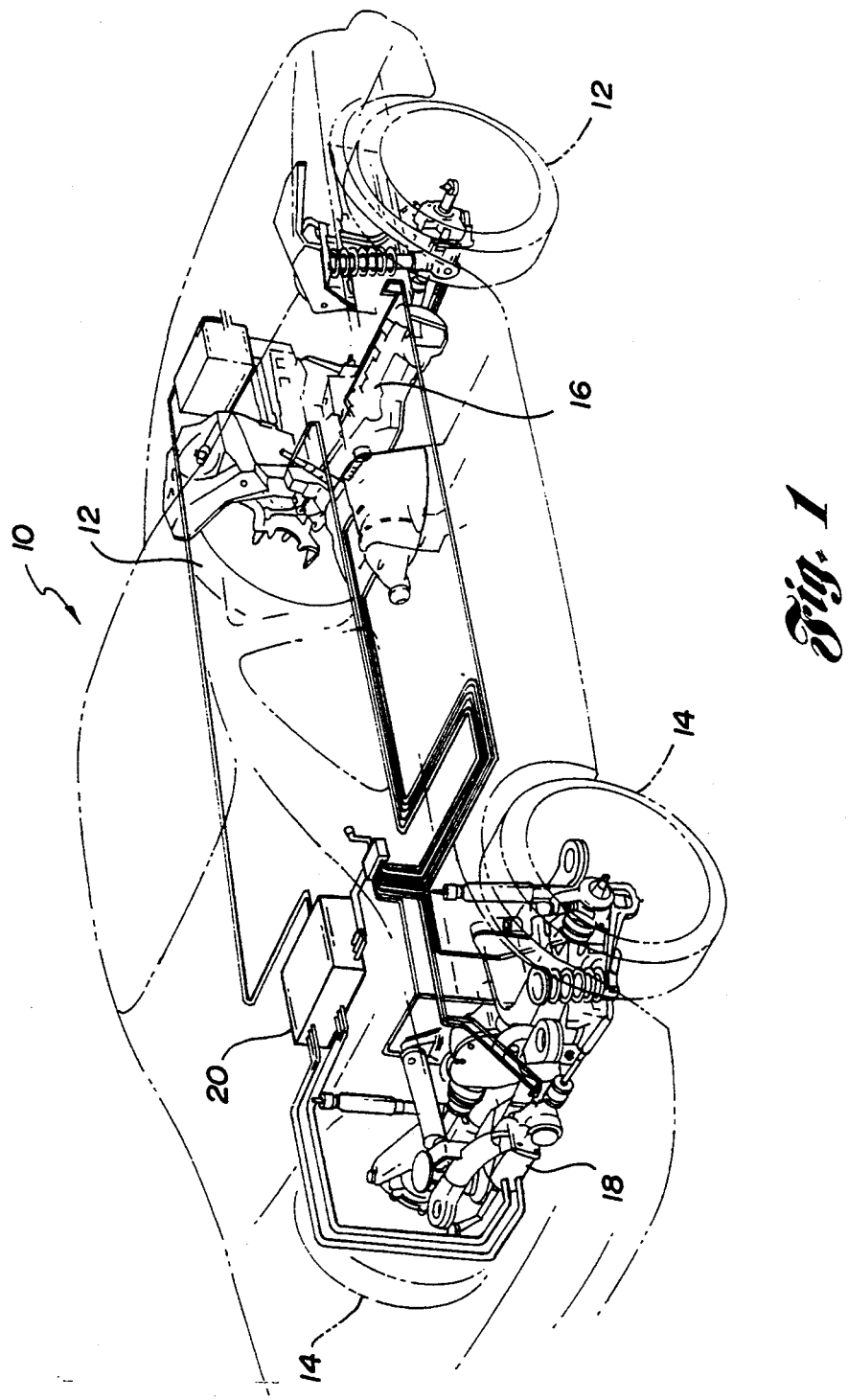
FIG. 1 is a perspective view of a vehicle having front and rear steerable wheels, for use with the present invention.

Referring now to FIG. 1, there is illustrated a vehicle shown generally by reference numeral 10, equipped with front steerable wheels 12 and rear steerable wheels 14. The front steerable wheels 12 are steered by a front steering gear assembly 16 and the rear steerable wheels 14 are steered by a rear steering gear assembly 18. The front steerable wheels 12 are manually operable by the vehicle operator and the rear steerable wheels 14 are controlled by a controller 20.

Figure 2:
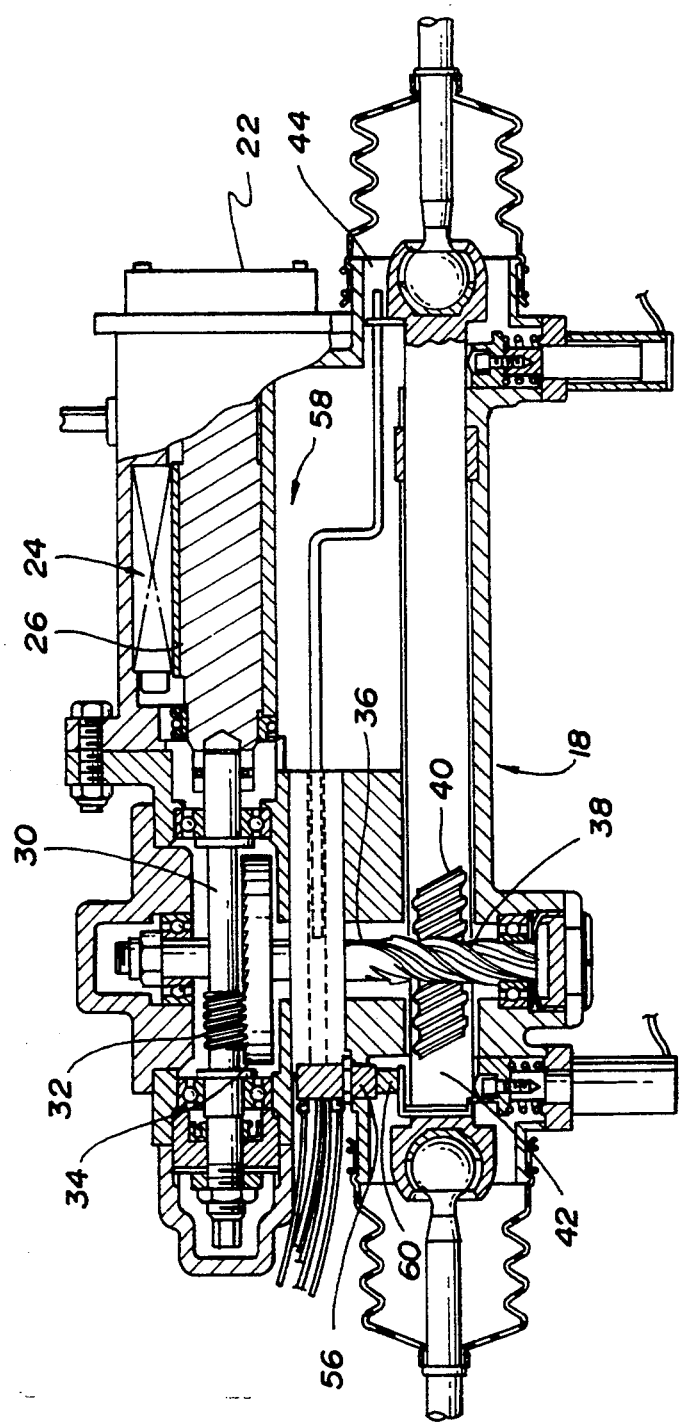
FIG. 2 is a partial cross-sectional view of a rear steering gear assembly for use with the present invention.

Turning now to FIG. 2, the rear steering gear 18 is shown in greater detail. In the preferred embodiment, the steering gear 18 is electronically controlled by the controller 20, seen in FIG. 1, and driven by a motor 22 having stator windings 24 and an armature 26. In the preferred embodiment, the motor 22 is a brushless DC motor commercially available from Sierracin/Magnedyne, of Carlsbad, Calif., United States of America. Alternatively, the rear steering gear 18 could be hydraulically driven.

As shown in FIG. 2, a motor shaft 30 and motor pinion 32 rotate in response to commands from the controller 20. The motor pinion 32 drives a face gear 34, which is mounted upon a pinion shaft 36. Rack pinion 38, which is formed at one end of the pinion shaft 36, meshes with teeth 40 which are formed on a rack 42. Thus, as the motor 22 rotates in response to commands from the controller 20, rack 42 will be caused to slide back and forth within a housing 44, thereby pushing or pulling steering rods (not specifically illustrated) and steering the rear steerable wheels 14. The steering system is described in greater detail in U.S. Pat. No. 4,936,401, issued to Baraszu et al. and assigned to the assignee of the present invention, which is hereby incorporated by reference.

Figure 3:
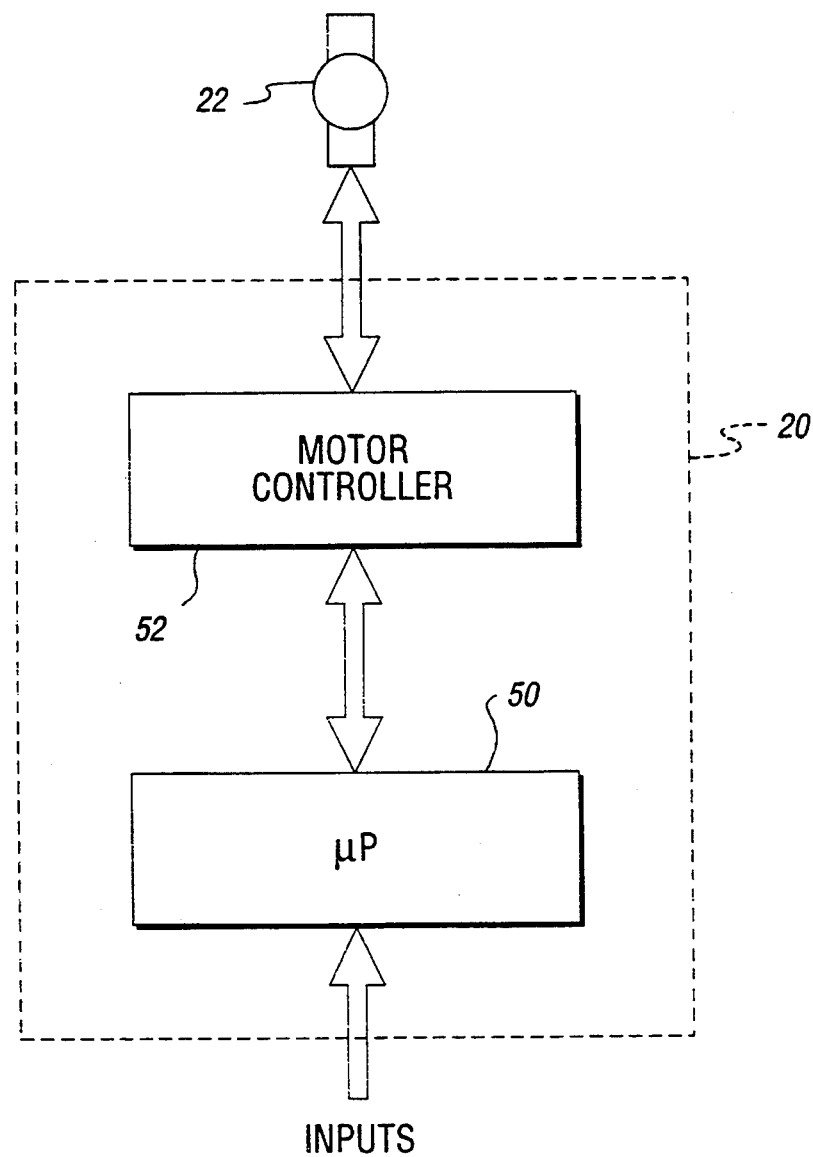
FIG. 3 is a block diagram of a controller for controlling the rear steerable wheels.

Referring now to FIG. 3, there is shown a block diagram of the controller 20, which includes a microprocessor 50 and a motor controller 52. In the preferred embodiment, the microprocessor 50 is an 8096 microprocessor and is utilized to implement the four wheel steering control strategy. The motor controller 52 manages delivery of power to, and commutation of, motor 22, which is preferably driven with pulse-width modulated field effect transistors (FET). The microprocessor 50 and the motor controller 52 include random access and read-only memories (RAM/ROM), analog-to-digital converters, and the like, not specifically illustrated. The RAM memory is utilized as a temporary storage device for various data related to the operation of the rear steering gear 18 and the ROM stores the program which implements the four-wheel steering strategy of the present invention as well as other information, such as constants. The microprocessor 50 communicates with the motor controller via a digital signal link.

As best shown in FIG. 2, the rear steering gear 18 utilizes a first sensor 56 for sensing the on-center position of the steering rack and a second sensor 58 to sense the position of the rack at any point along its path of travel. Preferably, the sensor 56 is a Hall-effect sensor mounted within the steering gear housing 44. The Hall-effect sensor 56 is triggered by a magnet 60, which is rigidly attached to the rack 42 and which reciprocates therewith as the rack slides back and forth during steering motion. When the Hall-effect sensor 56 is triggered, an electrical signal is sent to the controller 20 indicating the rear steering gear 18 is in the center position (i.e. zero steer angle). The second sensor 58 is an LVDT (linear variable differential transformer) which senses the position of rack 42 at any point along its path of travel so as to provide a steering position signal to the controller 20. The LVDT 58 provides a voltage signal to the controller 20 which is a direct indication of the position of the rack 42. The controller 20, utilizing signals from the Hall-effect sensor 56, LVDT 58 and a vehicle speed sensor (not specifically illustrated) actively controls the steer angles of the rear steering gear 18 so as to improve the handling performance of the vehicle 10, as described in greater detail herein below. The front steering gear 16 (not shown in detail) is similar to rear steering gear 18 and includes identical position sensors 56 and 58.

Figure 4:
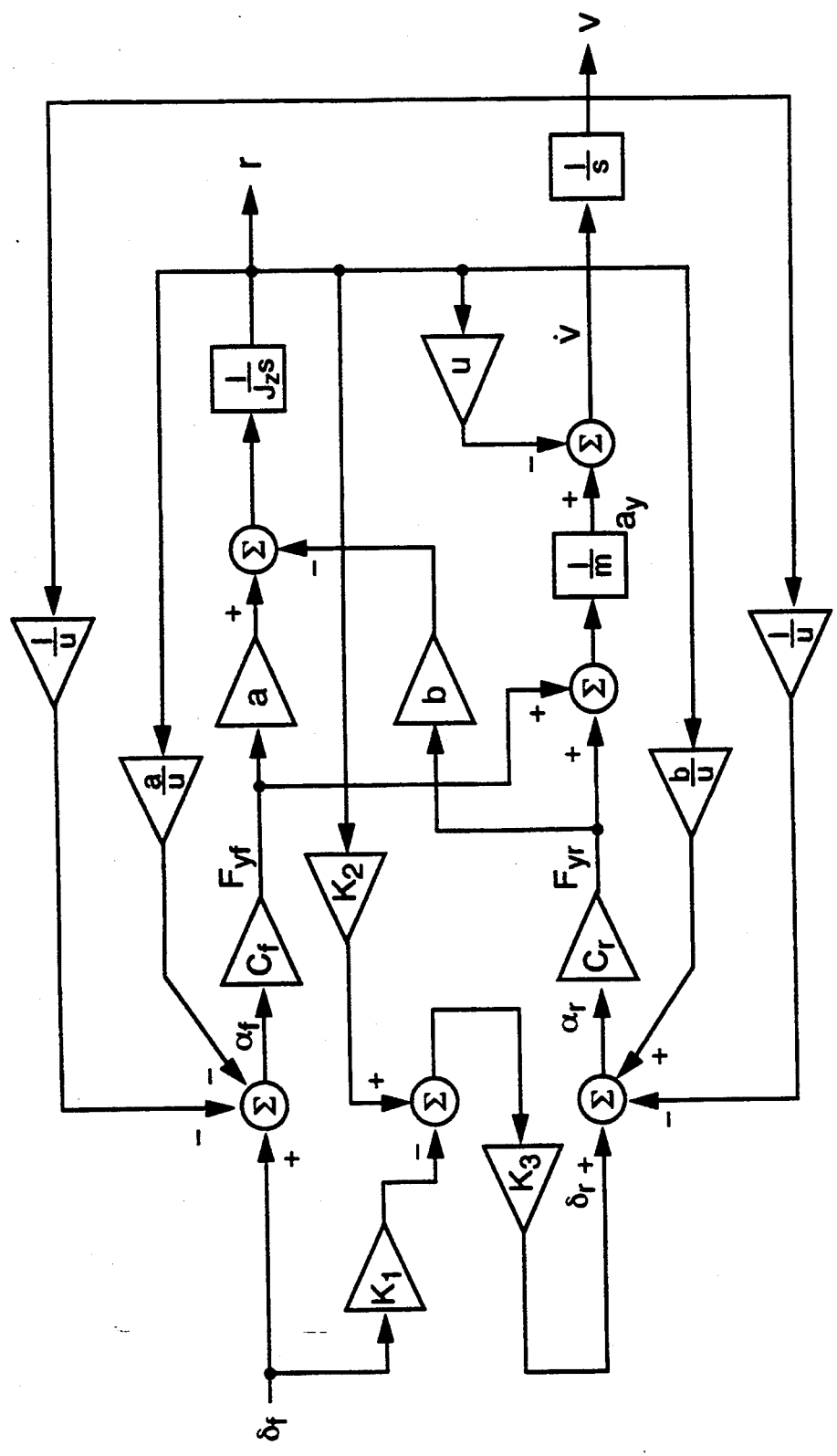
FIG. 4 is a block diagram of a simple bicycle model utilized in the development of the control strategy of the present invention.
Figure 5A:
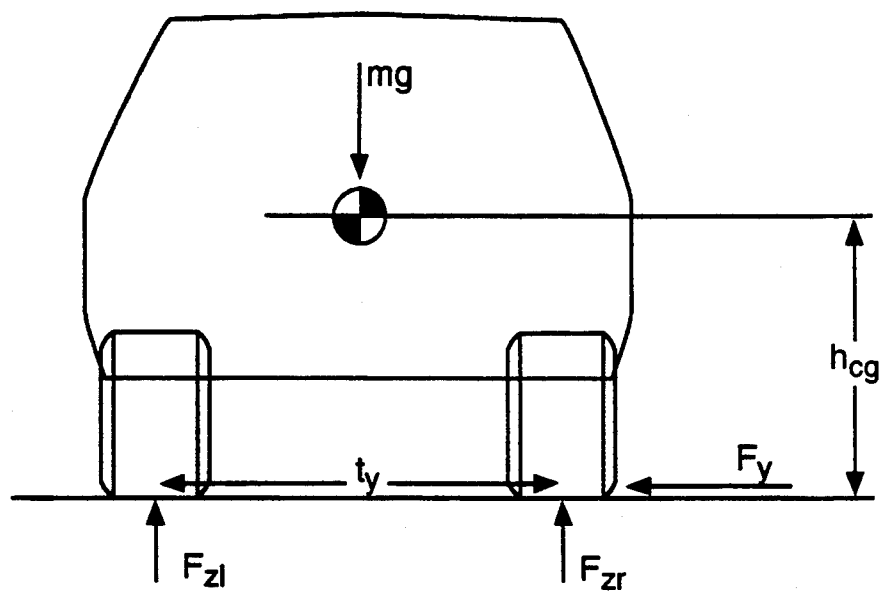
FIG. 5a is a front view of the vehicle shown in FIG. 1 illustrating various force vectors.

Referring now to FIG. 4, there is shown a block diagram of a simple bicycle model utilized in the development of the control strategy of the present invention. With additional reference to FIGS. 5a and 5b, this linear model, as discussed by J. Whitehead, Dept. of Mechanical Engineering, University of California, Davis, in his SAE Paper #880642 titled "Four Wheel Steering: Maneuverability and High Speed Stabilization," published Feb. 29, 1988, (hereinafter the Whitehead reference) assumes that the vehicle speed (U) is constant, that vehicle lateral and rotational motions are generated only by lateral tire forces at the road surface and that steer angles are small and within the linear region of the tires mounted on the front and rear steerable wheels.

The model has two state variables, lateral (sideslip) velocity of the center of gravity (v) and yaw rate (r). Generally, the sum of the lateral tire forces equals the mass times the lateral acceleration, which is made up of the time derivative of lateral velocity plus the centripetal acceleration:

$$m\dot{v} + mru = F_f + F_r = C_f\alpha_f + C_r\alpha_r$$

The angular acceleration about the yaw axis can be written as follows:

$$J_z\dot{r} = C_f a \alpha_f - C_r b \alpha_r$$

To complete the model, the following algebraic equations can be calculated from the vehicle geometry as follows:

$$\alpha_f = -\frac{v}{u} - \frac{ra}{u} + \delta_f$$

$$\alpha_r = -\frac{v}{u} + \frac{rb}{u} + \delta_r$$

Rewriting the above equations, the bicycle model shown in FIG. 4 can be expressed in state space form as:

$$\begin{bmatrix} \dot{v} \\ \dot{r} \end{bmatrix} = \begin{bmatrix} -\frac{C_f + C_r}{mu} & \frac{C_r b - C_f a}{mu} - u \\ \frac{C_r b - C_f a}{J_z u} & -\frac{C_r b^2 + C_f a^2}{J_z u} \end{bmatrix} \begin{bmatrix} v \\ r \end{bmatrix} +$$

-continued $$\begin{bmatrix} \frac{C_f}{m} \\ \frac{C_f a}{J_z} \end{bmatrix} \delta_f + \begin{bmatrix} \frac{C_r}{m} \\ \frac{-C_r b}{J_z} \end{bmatrix} \delta_r$$

where:
$\alpha_f$ = front tire slip angle (rad);
$\alpha_r$ = rear tire slip angle (rad);
$\delta_f$ = front wheel steer angle (rad);
$\delta_r$ = rear wheel steer angle (rad);
a = distance betw. center of gravity and front wheels (m)
$a_y$ = lateral acceleration (m/S$^2$)
b = distance betw. center of gravity and rear wheels (m)
$C_f$ = cornering stiffness—front tires (N/rad)
$C_r$ = cornering stiffness—rear tires (N/rad)
$F_{yf}$ = front tire lateral forces perpendicular to tires (N);
$F_{yr}$ = rear tire lateral forces perpendicular to tires (N);
$J_z$ = rotational inertia about yaw axis;
$K_1$ = gain parameter of CLYR controller;
$K_2$ = gain parameter of CLYR controller;
$K_3$ = gain parameter of CLYR controller;
m = vehicle mass (kg);
s = LaPlace variable;
u = vehicle velocity (m/S)

Preferably, the tire slip angles are measured as the difference between the tire plane, perpendicular to the axis of rotation, and the tire velocity vector. As illustrated, the model utilizes one user input $\delta_f$ and one control input $\delta_r$.

Figure 6:
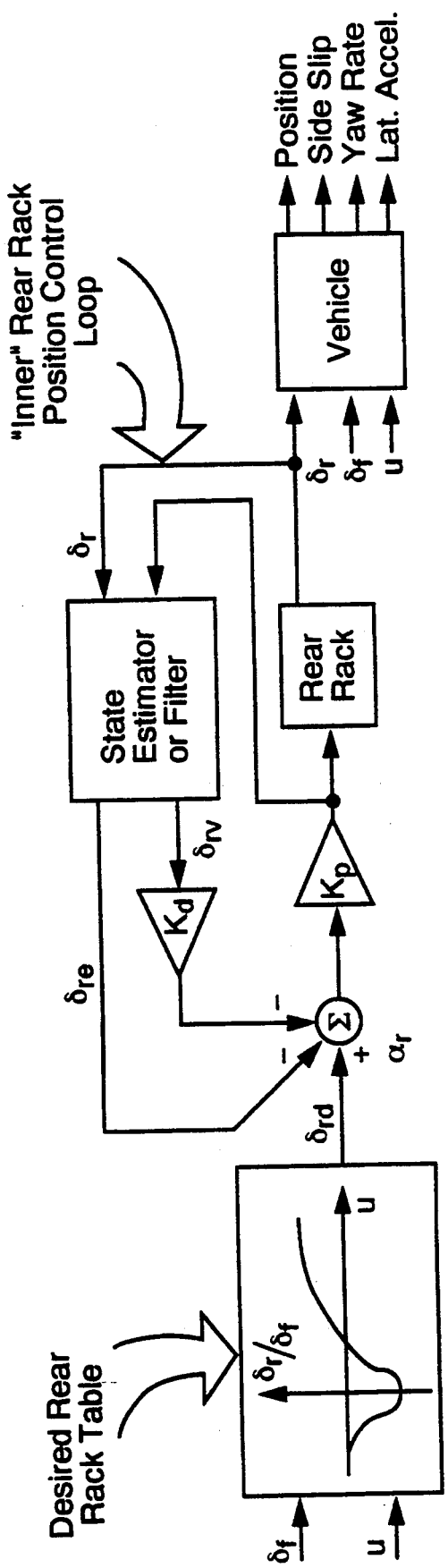
FIG. 6 is a block diagram of a general proportional steer controller for steering the rear steerable wheels.
Figure 8:
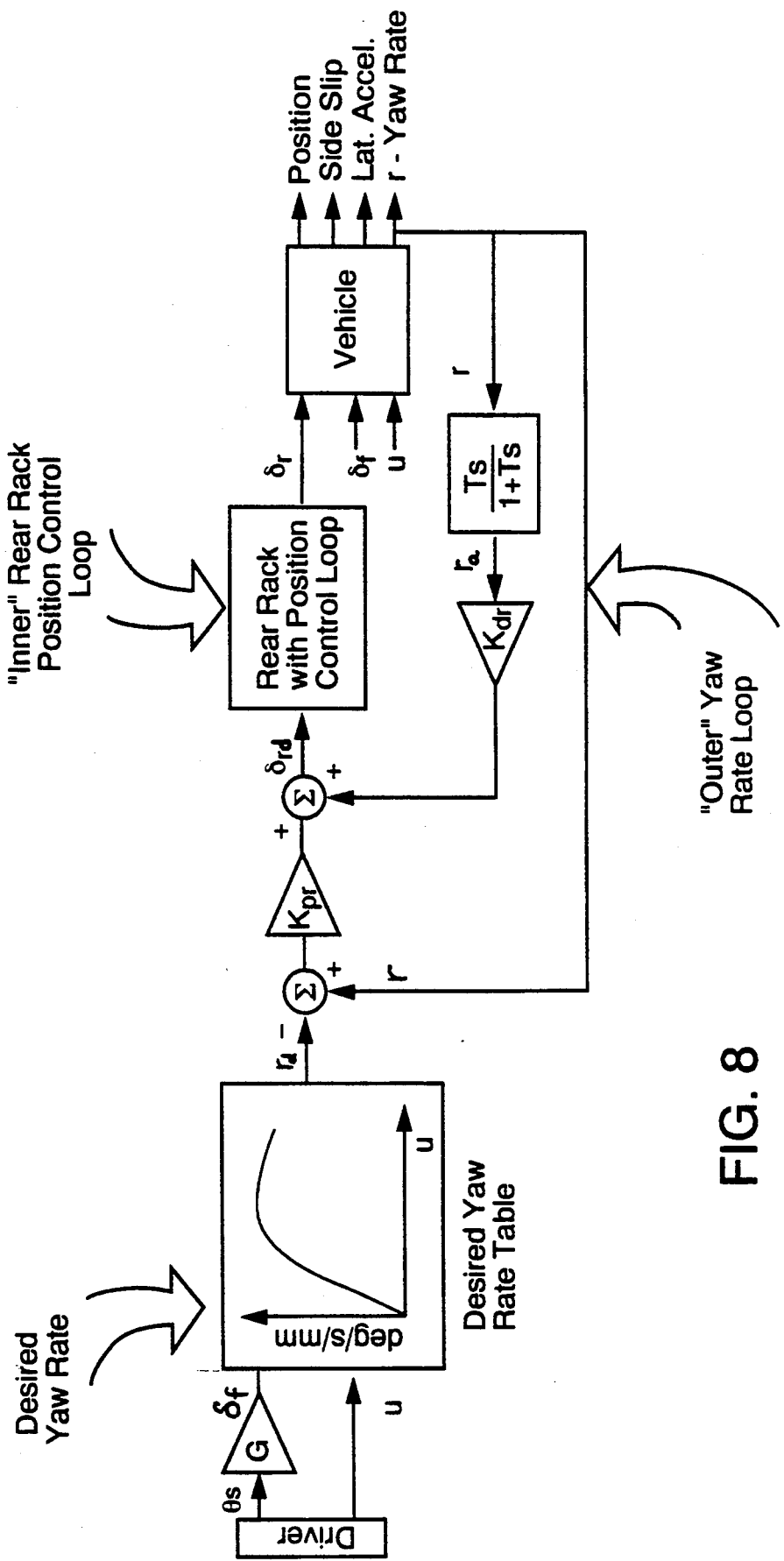
FIG. 8 is a block diagram of a general closed-loop controller for steering the rear steerable wheels.
Figure 10:
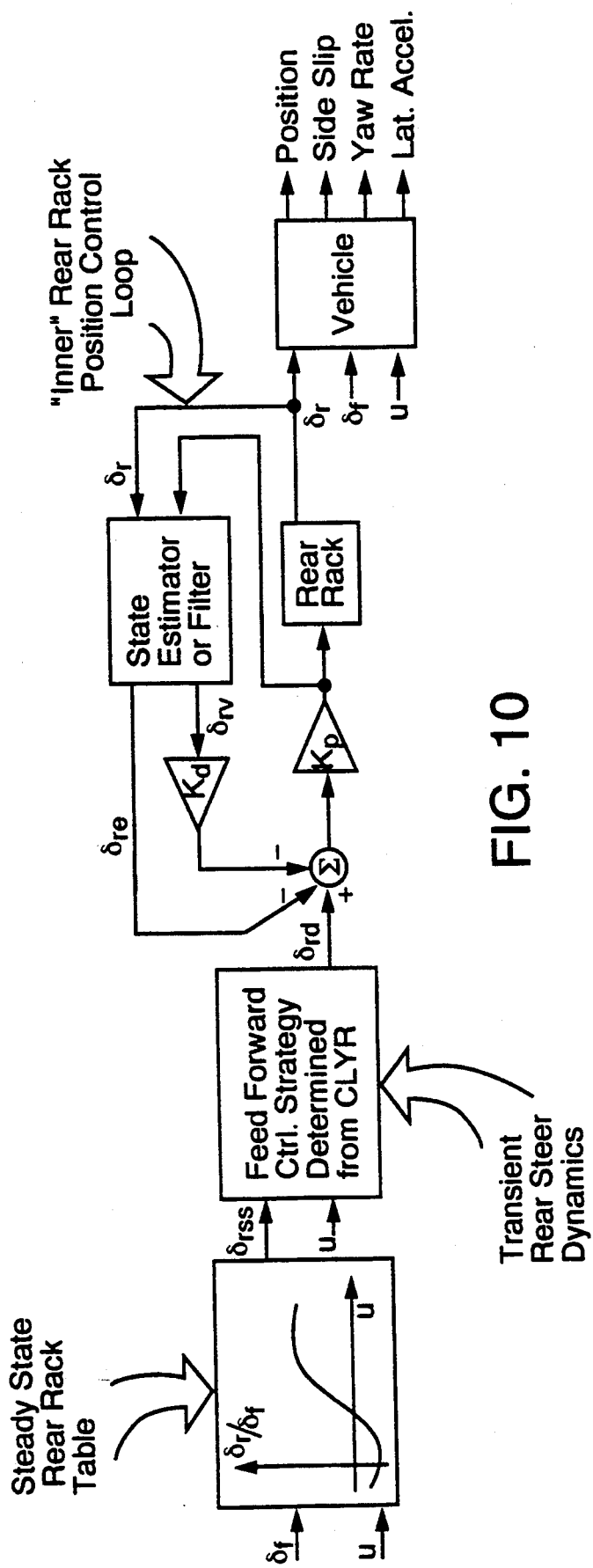
FIG. 10 is a block diagram of a general open-loop, or feedforward, controller for steering the rear steerable wheels.

Referring now to FIGS. 6, 8 and 10, there are shown block diagrams of three general types of four-wheel steer controllers. The "inner loop" control is common to all three controllers illustrated, and is basically a servo-position control loop which drives the rear steerable wheels to the commanded, or desired, rear steer angle. Preferably, this loop should have a bandwidth larger than that of the driver's steering inputs and of the dominant steering responses, yaw rate and lateral acceleration. Since it is typically possible for a driver to generate up to 5 Hz steering inputs and vehicle dynamics have a cutoff frequency of about 2 Hz, an inner loop with a 10 Hz bandwidth provides adequate control. To ensure proper rear wheel alignment, the inner loop should have a control accuracy of about 1 mm to 2 mm (i.e. 0.25° to 0.5° of rear steer).

Figure 5B:
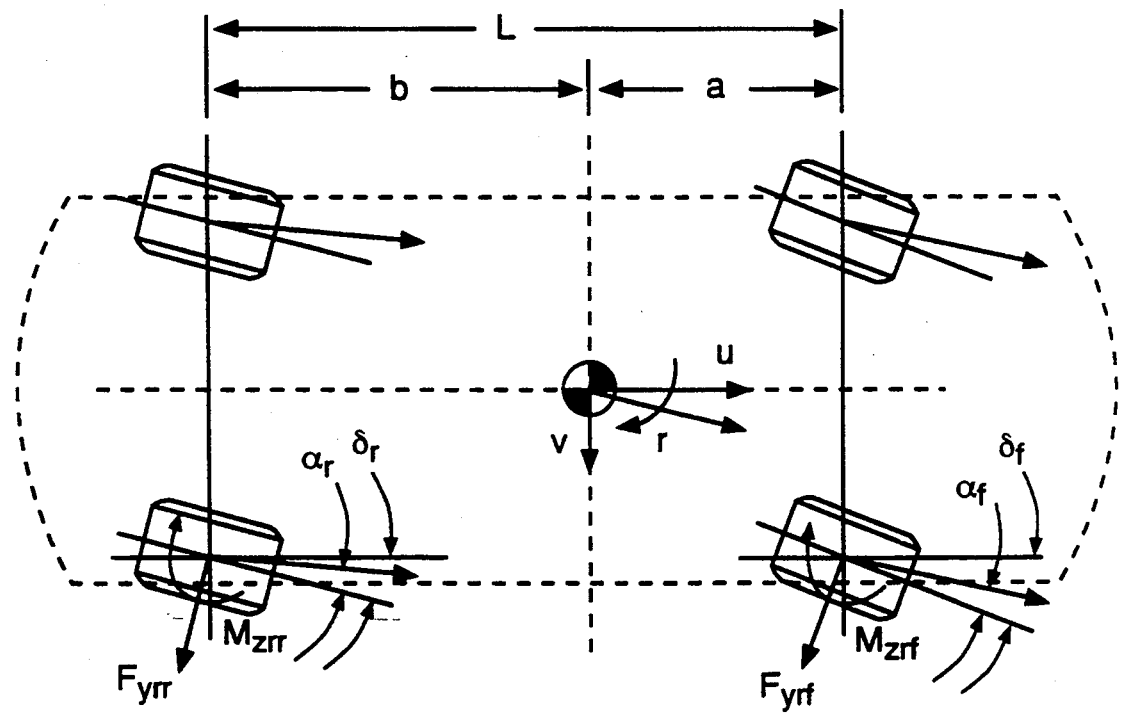
FIG. 5b is a plan view in phantom representation of the vehicle shown in FIG. 1 illustrating the front steerable wheels being in-phase with the rear steerable wheels.

Referring now to FIGS. 1, 5b and 6, the proportional controller steers the rear steerable wheels 14 to a proportion (variable and depending on vehicle speed) of the front steerable wheels 12, wherein $\delta_f$ represents the front rack position in terms of the steer angle, $\delta_r$ represents the rear rack position in terms of the steer angle, $\delta_{re}$ represents the estimated rear rack position, $\delta_{rv}$ represents the estimated rear rack velocity, $\delta_{rd}$ represents the desired rear rack position, u represents the vehicle speed, $K_d$ represents a velocity, or derivative, gain and $K_p$ represents a position gain. The ratio $\delta_r/\delta_f$ is negative or out-of-phase for low speeds (e.g. <25 mph) and is positive or in-phase for high vehicle speeds (e.g. >25 mph). Based on the linear bicycle model previously described, for any given speed the rear steer angle is preferably a fixed proportion of the front steer angle to achieve steady state zero body sideslip (i.e. $\beta = -v/u$). The ratio from the model is as follows:

$$\frac{\delta_r}{\delta_f} = \frac{-b + \frac{ma}{C_r L} u^2}{a + \frac{mb}{C_f L} u^2}$$

Figure 7:
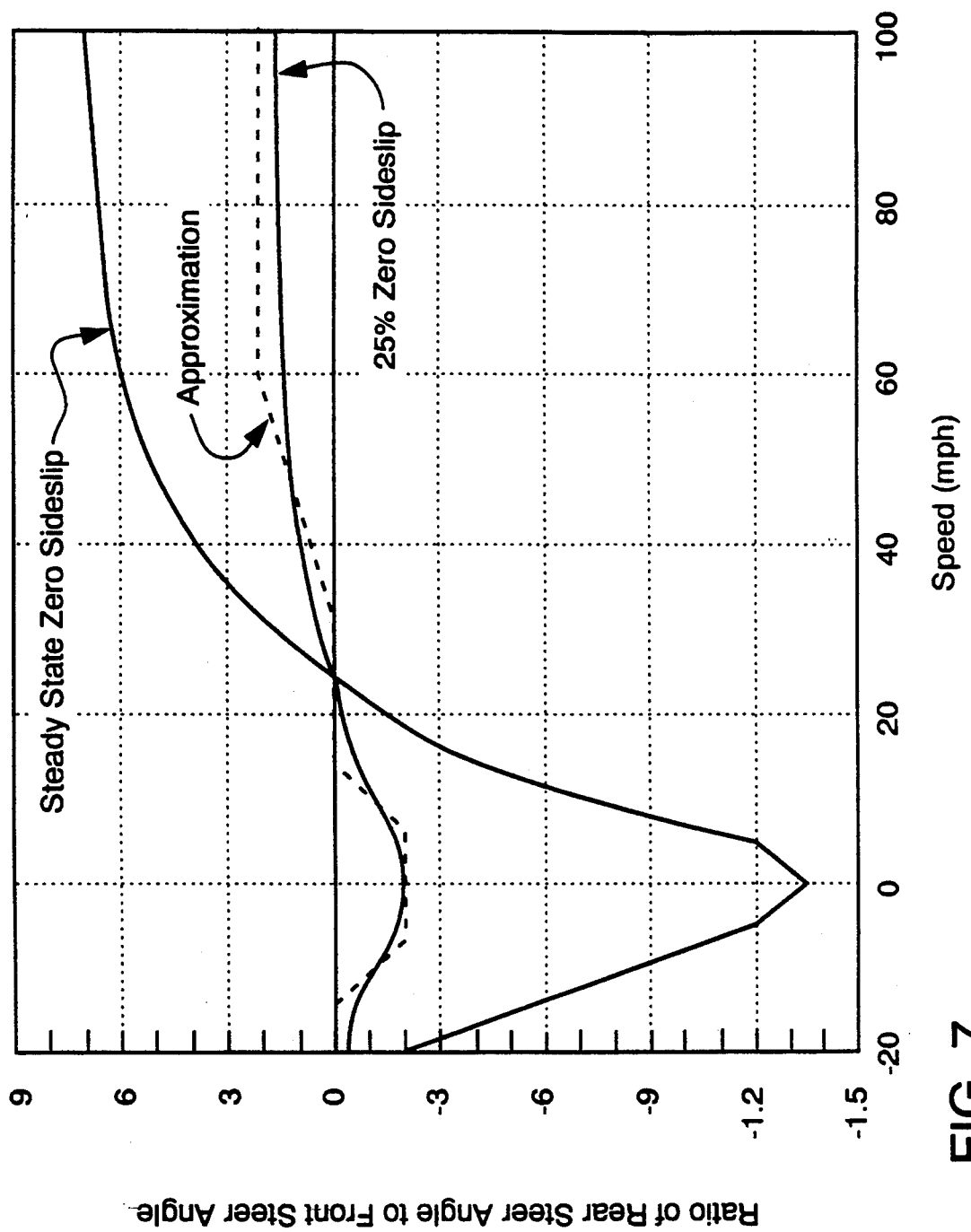
FIG. 7 is a graphical representation of the ratio of rear steer angle to front steer angle plotted versus vehicle speed.

FIG. 7 illustrates this ratio plotted against vehicle speed. Negative gains mean the rear steerable wheels 14 turn in the opposite direction or out-of-phase with the front steerable wheels 12. This strategy, in addition to eliminating steady-state sideslip, results in the vehicle 10 having a higher steering gain at low speeds and lower steady-state gain at high speeds. A higher low speed gain gives the vehicle a tighter turning radius, making the vehicle more maneuverable in tight spaces. At high speeds, the vehicle feels more stable due to a slower yaw response and will require larger steer inputs to turn the car. Additionally, a proportional steer strategy generates a lateral force before the vehicle produces a yaw rate, since the rear wheels 14 turn at the same time as the front wheels 12, allowing the vehicle to generate lateral acceleration and the resulting lateral movement quicker than a two-wheel steer (2 WS) vehicle.

Proportional steer strategies, however, have disadvantages. First, the steady-state gain of the vehicle from steering input to both yaw rate and lateral acceleration is greatly reduced for speeds above about 25 mph, which is perceived by the vehicle operator to be understeer. Also, the proportional steer strategy degrades the transient handling performance. Specifically, the yaw rate response of the vehicle is degraded since the lateral acceleration response times are sped up. To minimize these problems, the proportional gain can be reduced from 75%–90%, which results in retention of some of the benefits without drastically changing the vehicle characteristics. FIG. 7 illustrates the proportional gain reduced by about 75% and a piecewise linear approximation (shown as a dashed line).

Closed-loop controllers, such as that shown generally in FIG. 8, typically require feedback of vehicle parameters such as yaw rate (i.e. rotational velocity of the vehicle about its center of gravity) or lateral acceleration to achieve adequate control. The closed-loop yaw rate (CLYR) controller shown determines a desired rear rack position ($\delta_r$) based on steering wheel input ($\theta_s$), steering gear ratio (G), front rack position ($\delta_f$) and wherein $r_d$ represents the desired yaw rate, $r_a$ represents the yaw rate acceleration, $\delta_{rd}$ represents the desired rear rack position, u represents the vehicle speed, $K_{pr}$ represents a position gain on yaw rate error and $K_{dr}$ represents a gain on the derivative of yaw rate.

With additional reference to FIG. 4, for the CLYR controller, the gain $K_1$ is preferably set to equal a gain which converts front steering angle to a desired yaw rate, the gain $K_2$ is preferably set equal to the value 1 and the gain $K_3$ is preferably set equal to a proportional gain on yaw rate error. A derivative feedback term on yaw rate is preferably added to help achieve a well-damped yaw response. Additionally, the yaw rate measurement is passed through a 5 Hz single-pole high-pass filter to approximate a derivative and provide adequate differentiation for yaw signals within the bandwidth of the vehicle's yaw response, to yield the CLYR 4 WS control structure shown in FIG. 9.

Figure 9:
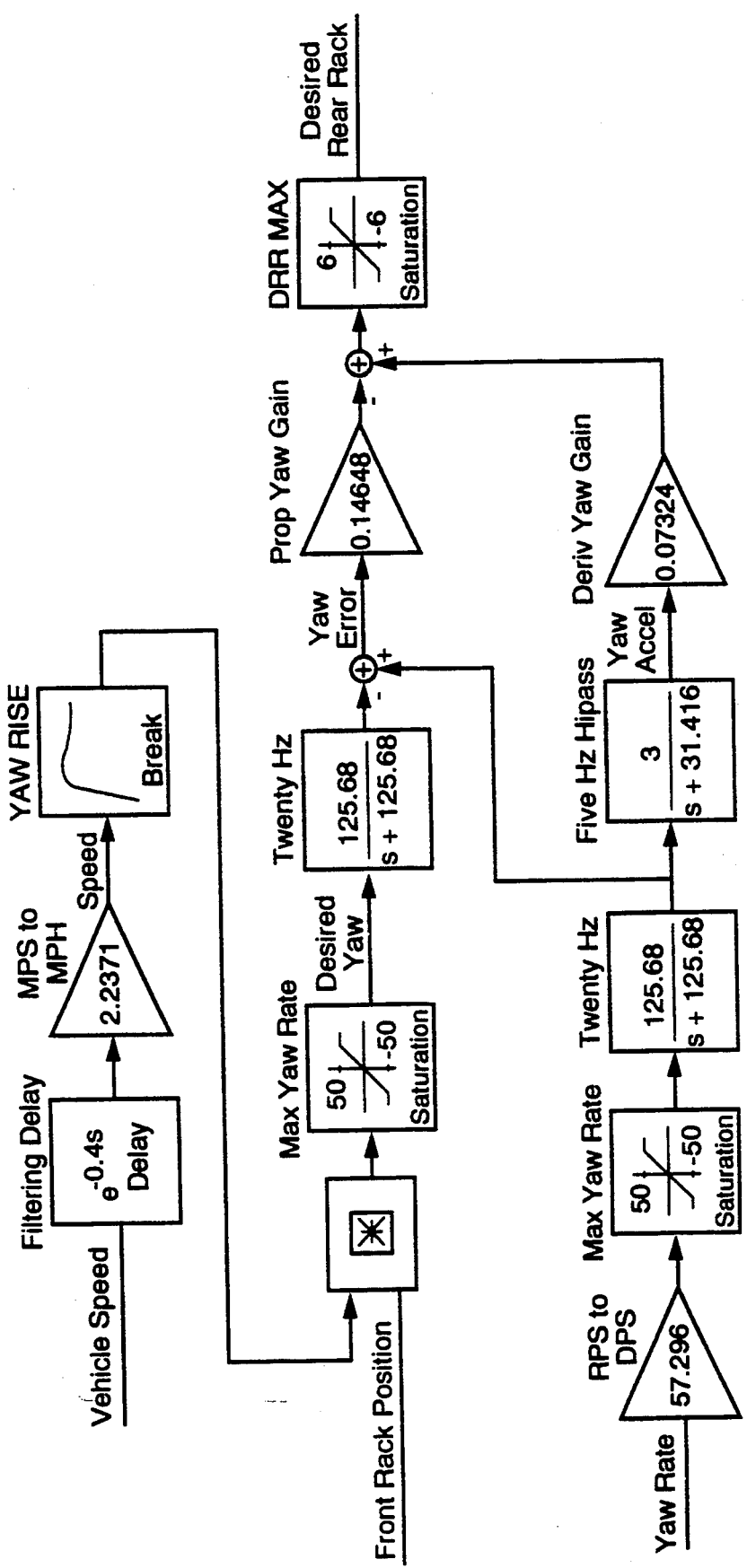
FIG. 9 is a block diagram of the closed-loop yaw rate (CLYR) controller for use with the present invention.

With continued reference to FIGS. 4 and 9, the conversion gain, $K_1$, is preferably determined from steering angle and vehicle speed for desired steady state yaw rate. By driving the vehicle at constant speeds with low frequency (i.e. <0.5 Hz) sinusoidal steering inputs within the linear range of the tires, a desired steady state yaw rate curve can be plotted and used to tune and validate the linear bicycle model. Another choice for the gains $K_1$, $K_2$ and $K_3$ which dynamically maintain zero body sideslip is provided in the Whitehead reference as follows:

$$K_1 = -\frac{C_f}{C_r},$$

$$K_2 = \left(\frac{mu}{C_r} - \frac{b}{u} + \frac{C_f a}{C_r u}\right), \text{ and}$$

$$K_3 = 1$$

Figure 11A:
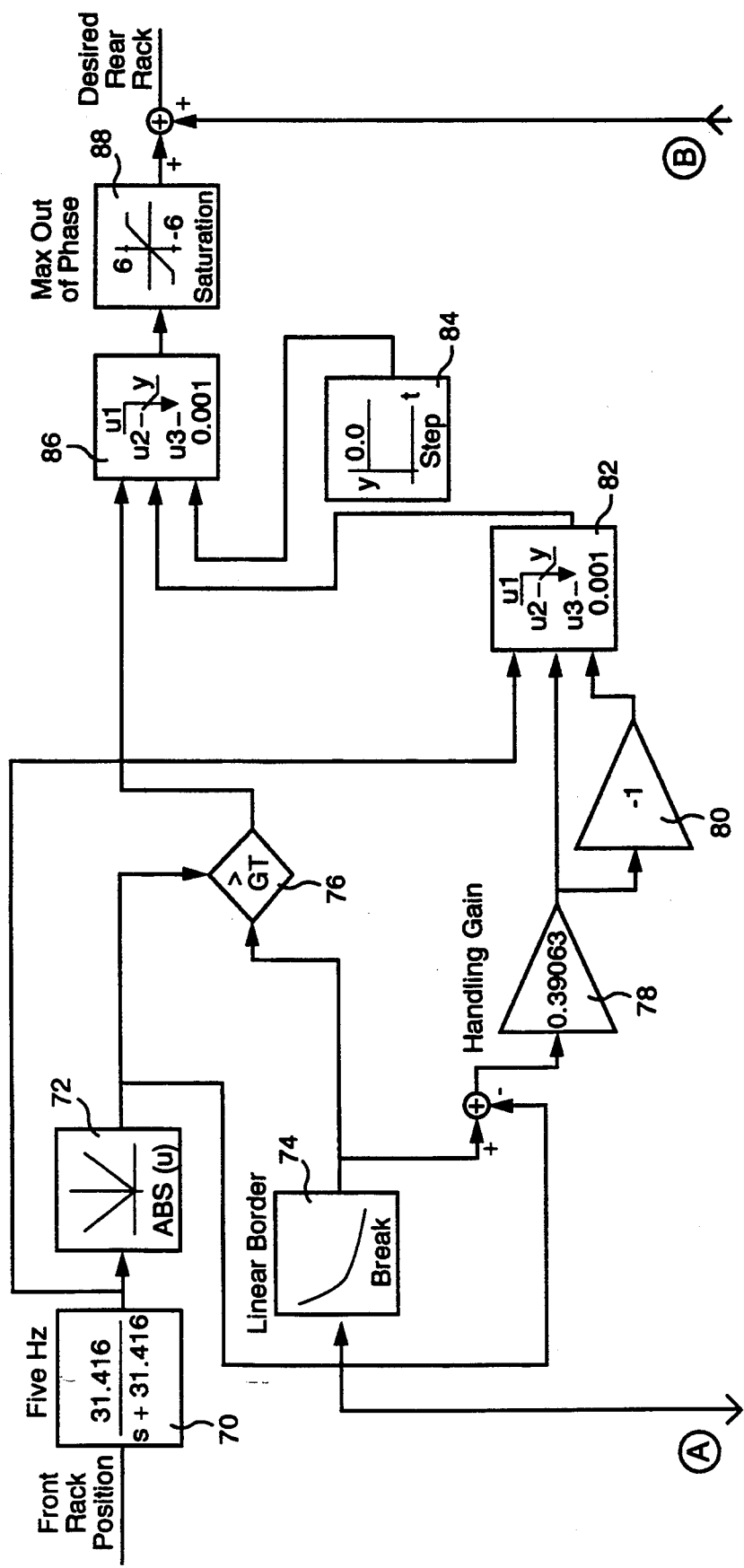
FIGS. 11a and 11b are block diagrams of the open-loop feedforward controller which implements the control strategy of the present invention.
Figure 11B:
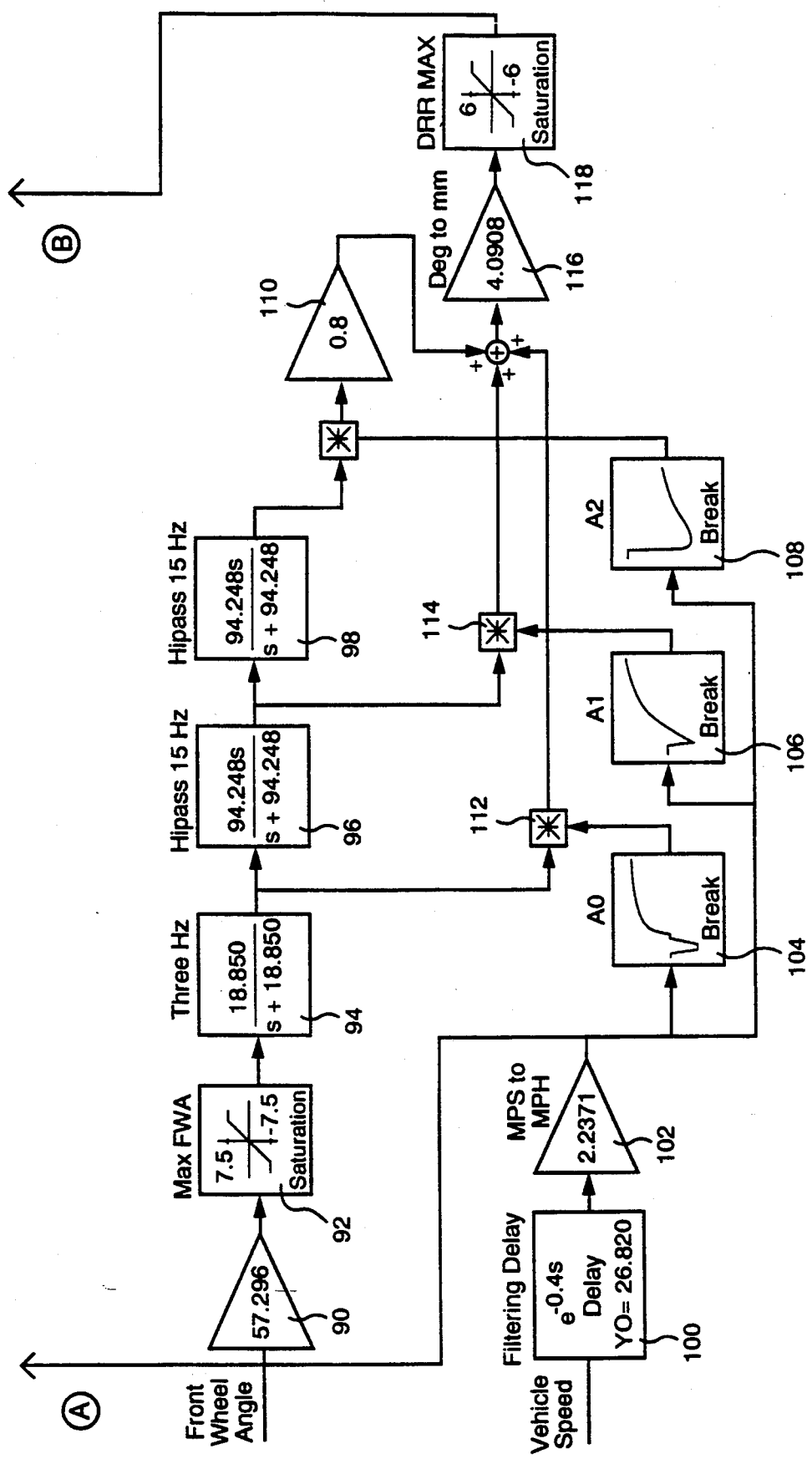

Referring now to FIGS. 10 and 11, there is shown a block diagram of a general open-loop control strategy for a four wheel steer vehicle and a block diagram of the open-loop control strategy of the present invention, respectively. The general open-loop controller of FIG. 10 determines a desired rear rack position ($\delta_{rd}$), based on desired front rack position ($\delta_f$) and vehicle speed (u) and wherein $\delta_r$ represents the rear rack position, $\delta_{re}$ represents the estimated rear rack position, $\delta_{rv}$ represents the estimated rear rack velocity, $\delta_{rss}$ represents the steady state desired rear steer angle, $K_d$ represents a velocity, or derivative, gain and $K_p$ represents a position gain. The open-loop, or feedforward, control strategy of the present invention, shown in FIGS. 11a and 11b, utilizes a minimum number of sensors (no yaw sensor), does not require feedback of vehicle parameters and provides better handling in the nonlinear region of vehicle tires, as described in greater detail below. The idea behind an open-loop controller is that given adequate knowledge of the vehicle dynamics one can calculate a feedforward compensator which will provide the same performance as a closed-loop yaw rate feedback controller.

Figure 12:
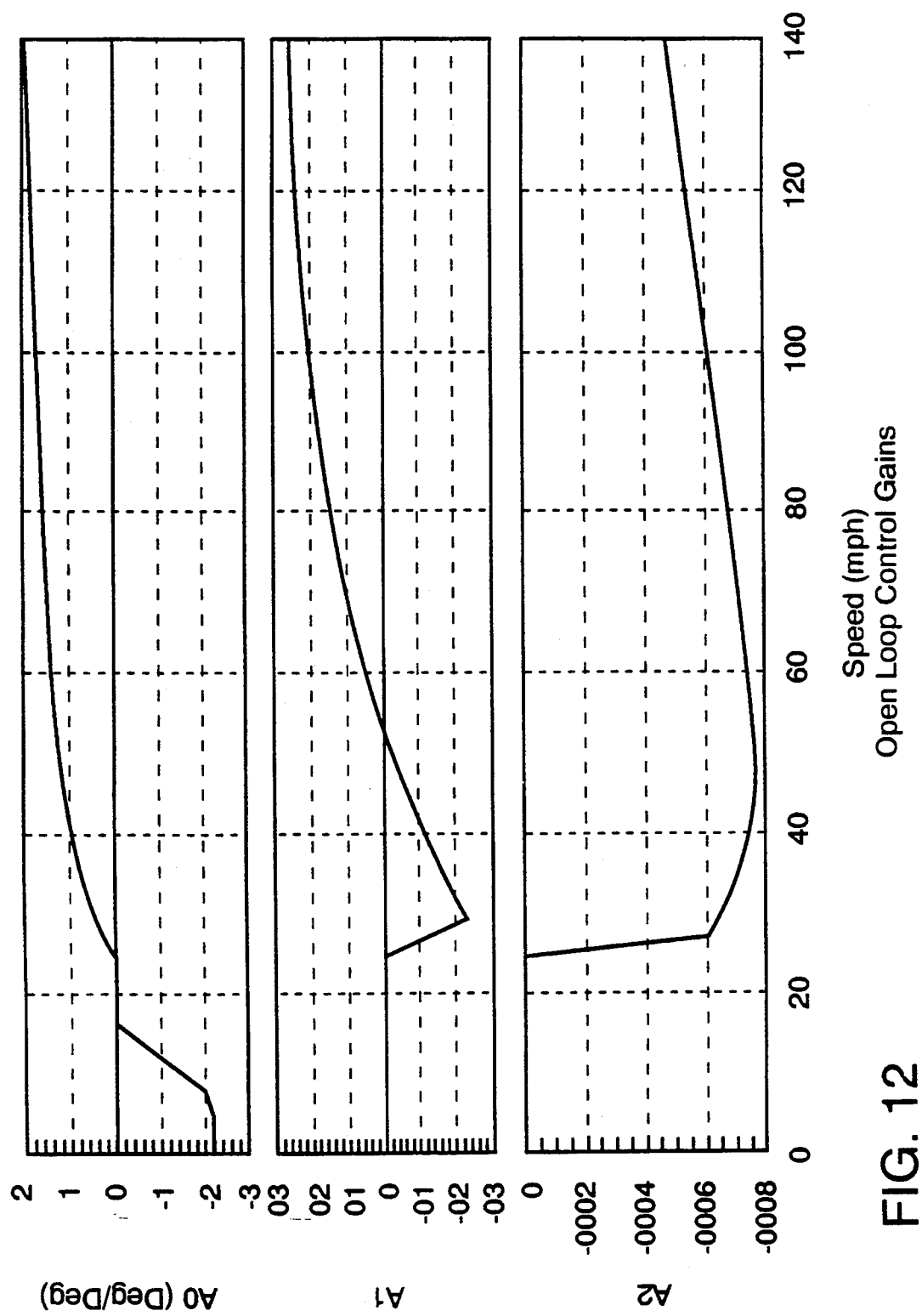
FIG. 12 is a graphical representation of the open loop, or feedforward, control gains for use with the present invention.

With additional reference to the linear bicycle model shown in FIG. 4, and utilizing the vehicle parameters and control gains from the CLYR controller (previously described and shown in FIGS. 4, 8 and 9), it is possible to calculate the feedforward transfer function from front steer angle to rear steer angle and apply it directly as a feedforward controller. To calculate the feedforward transfer function, the gains $K_1$, $K_2$ and $K_3$ are preferably determined utilizing the zero body sideslip algorithm previously discussed. Alternatively, in-vehicle calibration could also be utilized. By substituting these gains into the bicycle model, the transfer function having the form:

$$\frac{d_r(s)}{d_f(s)} = G(s) = \frac{a_0 + a_1 s + a_2 s^2}{1 + b_1 s + b_2 s^2}$$

can be determined and applied as a feedforward control algorithm, where $a_0$, $a_1$, $a_2$, $b_1$ and $b_2$ are dependent on the control gains and vehicle parameters of the model. The implementation of this transfer function with a "perfect" actuator is designed to keep body sideslip at zero and have similar performance as the CLYR. The preferred implementation involved inverting the filtering delay (i.e. $1/(1+Ts)$) on the front rack and performing long division on $G(s)*(1+Ts)$ to obtain a finite series approximation of the controller:

$$G(s)(1 + Ts) = \frac{a_0 + a_1 s + a_2 s^2}{1 + b_1 s + b_2 s^2}(1 + Ts)$$

$$\approx A_0 + A_1 s + A_2 s^2$$

where $1/(1+Ts) = 18.85/(s+18.85)$, which is representative of a 3 Hz low pass filter. Next, the differentiators should be replaced with high pass filters represented by $94.248s/(s+94.248)$, which is more robust to sensor noise. This gives a final feedforward transfer function of:

$$\frac{d_r(s)}{d_f(s)} = A_0 H_1(s) + A_1 H_2(s) H_1(s) + A_2 H_2^2(s) H_1(s)$$

where $H_1(s)$ is the low pass noise filter and $H_2(s)$ is the high pass filter. Preferably, the cut-off frequencies for these filters should be selected based on subjective feel and magnitude of sensor noise. Since it can be seen that $A_0$ is simply the steady state front to rear steering gain used in the proportional steering strategy previously described, this gain is preferably reduced by approximately 75% to avoid any problem of understeer. Acceptable transient responses can be achieved by also reducing $A_2$ and not changing $A_1$. FIG. 12 graphically illustrates the preferred controller gains which are gain scheduled over the speed range of the vehicle.

Figure 13:
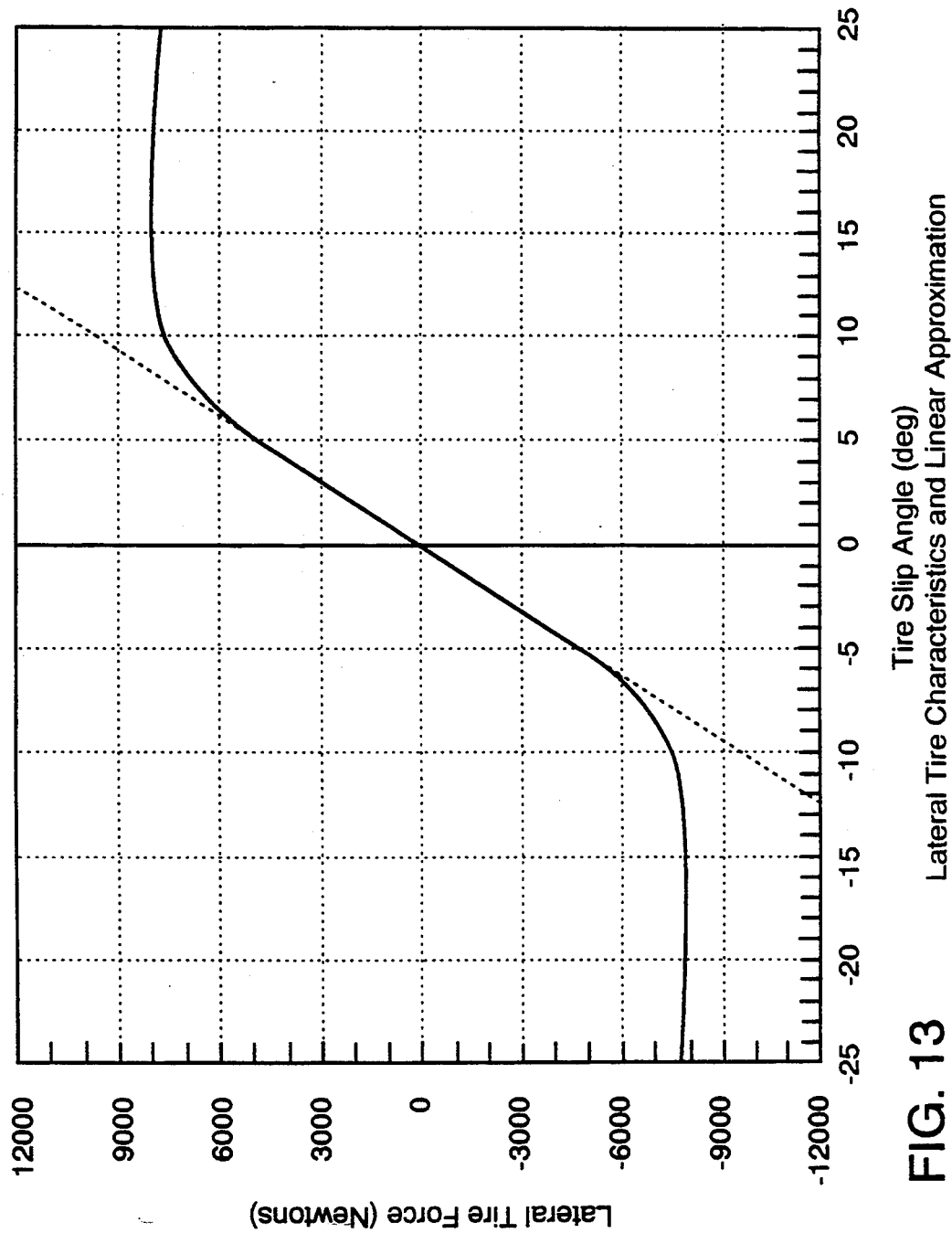
FIG. 13 is a graphical representation of the lateral tire forces versus tire slip angle and an associated linear approximation.

If vehicle dynamics were truly linear and the model is exact, the feedforward controller shown in FIGS. 11a and 11b (prior to modifications to $A_0$, $A_1$ and $A_2$) would perform substantially identically to the CLYR controller. Since vehicle dynamics are not truly linear, a purely linear approximation will not result in the best possible vehicle handling performance. Prior art 4 WS controllers, such as that shown in U.S. Pat. No. 4,901,811, utilize the cornering stiffness (i.e., the slope of the lateral tire force curve at a zero slip angle) of the tires as a linear approximation, even though the generation of lateral force by the tires is the dominant non-linearity of the vehicle's steering dynamics. One such linear approximation ($F_{yf} = C_f * a_f$) is shown in FIG. 13, wherein the solid line represents the actual tire characteristic and the dotted line represents an associated linear approximation. A 4 WS system based on this linear model, however, can introduce large amounts of understeer when driven in the non-linear region of the tires. For the majority of production cars, the front tires will saturate first, limiting the possible yaw rate and lateral acceleration. If the controller does not compensate for this saturation, more lateral forces will be generated at the rear tires. These additional rear forces will be in the direction of understeer, making the car less maneuverable in handling situations.

Figure 14:
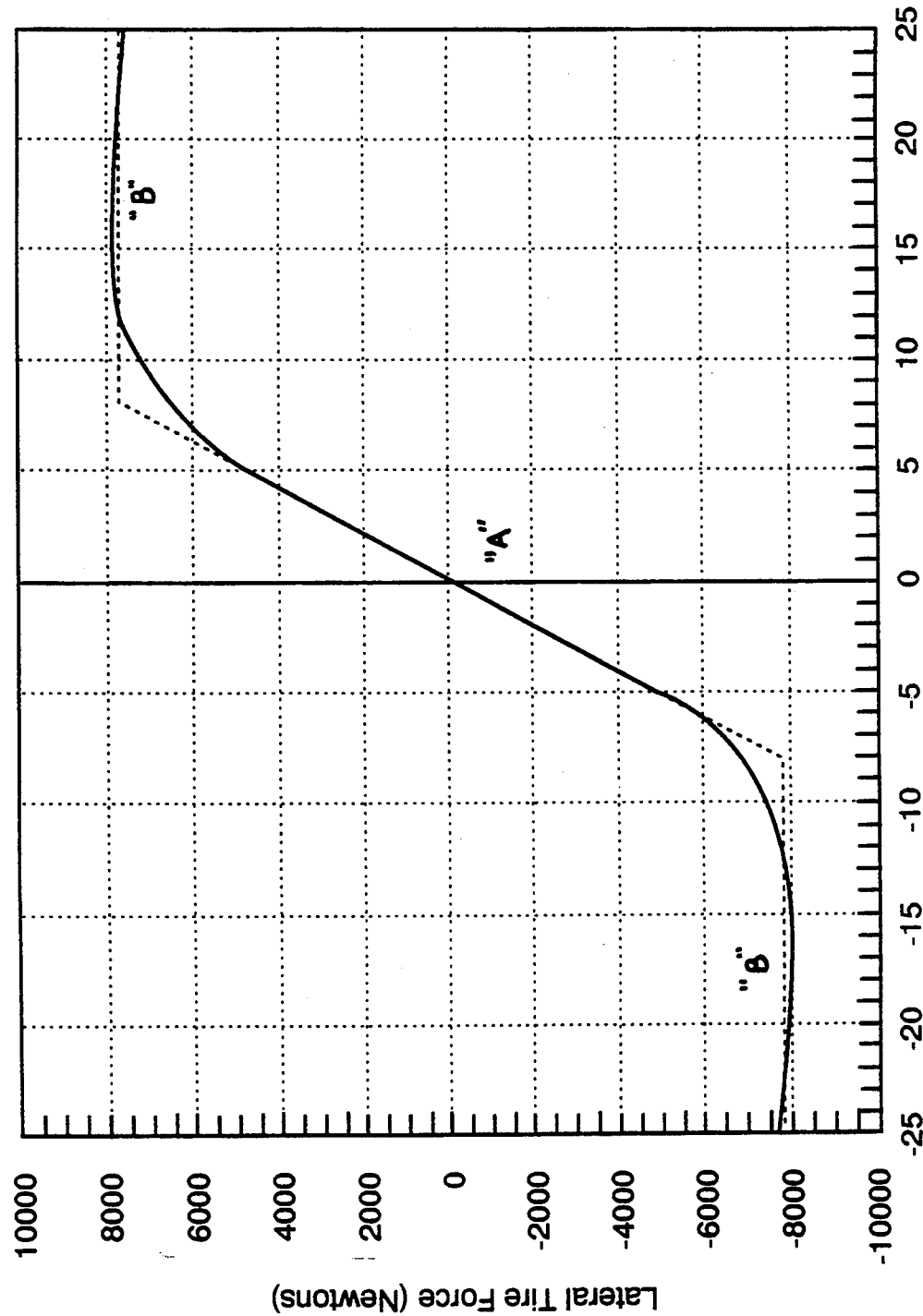
FIG. 14 is a graphical representation of the non-linear tire model utilized by the present invention.

With additional reference to FIG. 14, there is shown a tire model implemented in the feedforward controller of the present invention. As illustrated, this model is linear for small slip angles (shown generally at reference point "A") but also includes a saturation region (shown generally at reference points "B"). With the inclusion of tire saturation, the controller can determine when the vehicle has reached a maximum steady state yaw and lateral acceleration to avoid adding excessive understeer. Additionally, by steering the rear steerable wheels back toward the out-of-phase direction at the point of maximum steady state yaw and lateral acceleration, the feedforward controller can actually improve vehicle transient performance and steady state attitude (i.e., the relationship of the vehicle's centerline to the vehicle's path of travel). Preferably, the feedforward controller imitates the actions available from a closed-loop controller. Once the front tires are in saturation, the car cannot generate additional yaw as the steering wheel angle increases. As the CLYR controller identifies the increasing yaw error, the controller will begin to steer the rear steerable wheels toward the out-of-phase direction in proportion to the excess front wheel angle. To accomplish this with the feedforward controller, an additional term is added to the rear steer control command once the tires are in the saturation region, as described in greater detail herein below.

Figure 15:
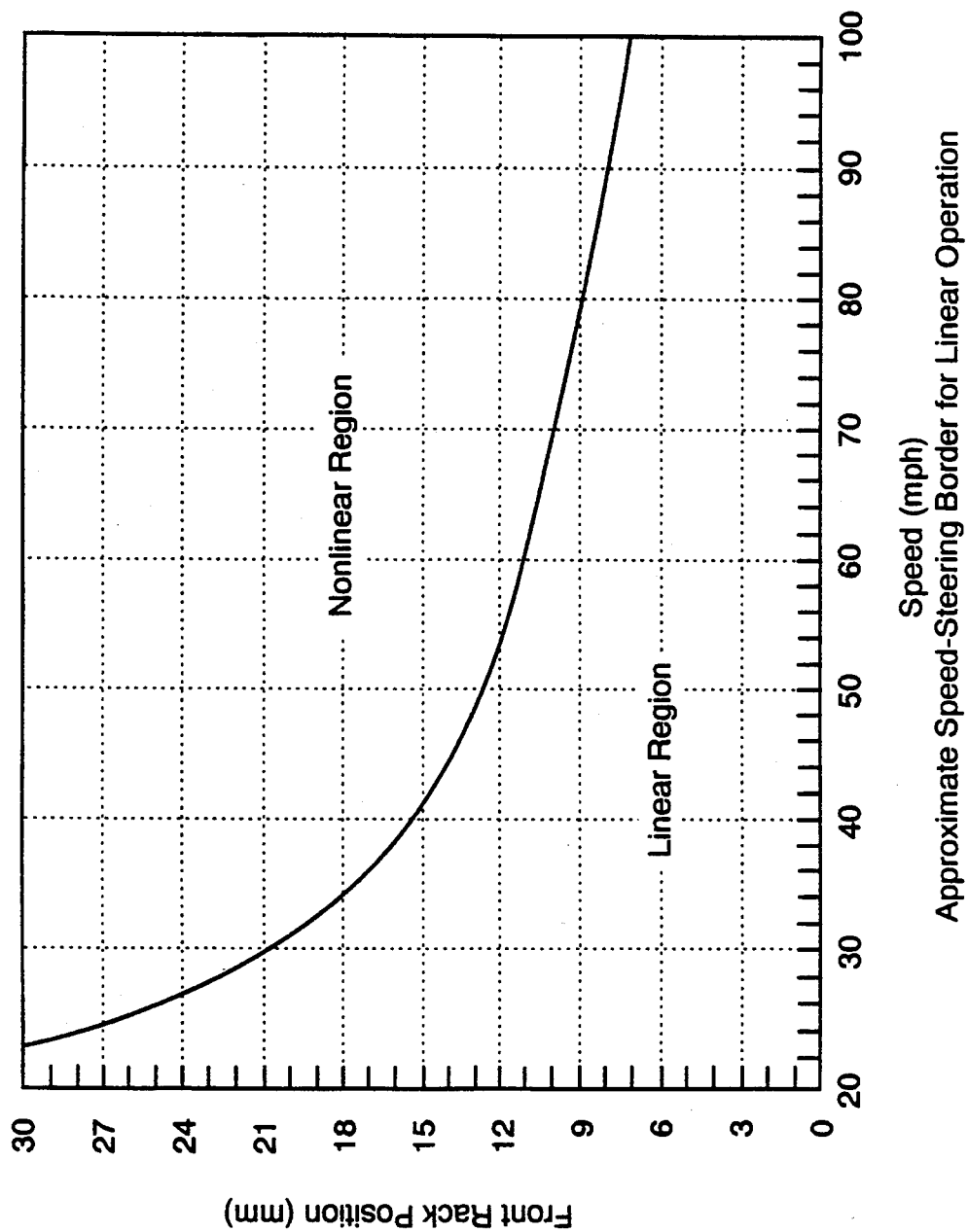
FIG. 15 is a graphical representation of front steering rack position plotted versus vehicle speed illustrating the boundary between a linear tire approximation and a saturated tire approximation.

Referring now to FIG. 15, a graph illustrates the front steering rack position plotted against the vehicle speed, to define the boundary between a linear tire approximation and a saturated tire approximation. As an illustrative example, at a vehicle speed of approximately 80 mph, the tires enter the saturation region at approximately 9 mm of front rack travel. If the vehicle has crossed into the nonlinear region, the controller computes the additional term to be added to the rear steer control command by taking the difference between the front wheel angle and the tire saturation angle (from FIG. 15) and multiplying that difference by a handling gain. By steering the rear steerable wheels back toward center (i.e. out-of-phase for severe corners), the open-loop controller emulates the CLYR controller at tire saturation.

Referring once again to FIGS. 11a and 11b, the block diagram of the open-loop controller will be discussed in detail. Control block 70 represents a low pass filter having a cutoff frequency of approximately 5 Hz which functions to remove sensor noise from the front rack position sensor measurement. Control block 72 operates to take the absolute value of the filtered front rack position signal. At control block 74, a table look-up is performed to determine the approximate front rack position at which the front tires begin to saturate. This table is shown graphically in FIG. 15. Preferably, tire saturation is based on front rack position and vehicle speed. At block 76, the controller determines if the absolute value of the front rack position is in the nonlinear region of the front tires. Block 78 represents the handling gain ($K_h$), which is multiplied with the difference between the front rack position determined at block 72 and the nonlinear border rack position determined at block 74. At block 80, the sign of the handling gain changed and, at block 82, the controller selects the version of the handling gain (i.e. positive or negative) which is out-of-phase with the front wheels. Control block 86 utilizes the output from block 76, block 82 and the value of zero ("0") output from block 84, to calculate the handling term. If, however, block 76 is "false" (i.e. the front tires are not in saturation), the handling term is zero ("0"). At block 88, the value of the calculated handling term is limited to a rack position of approximately ±6 mm. The measured front wheel angle is converted from radians to degrees at control block 90. At block 92, the measured value of the front wheel angle is limited to approximately ±7.5°. Preferably, this limit is not applied at low speeds (e.g. <25 mph) where larger wheel angles are possible. Control block 94 implements a low pass filter having a cutoff frequency of approximately 3 Hz, which functions to remove sensor noise from the front wheel angle signal. Control blocks 96 and 98 implement a high pass filter having a 15 Hz pole to provide the function of a differentiator. The control block 100 implements the filtering delay in calculating the vehicle speed as seen in the vehicle and control block 102 converts the vehicle speed from meters per second (m/S) to miles per hour (mph). At control block 104, a table look-up is performed to determine the gain ($A_0$), based on vehicle speed. Preferably, the table values include the 75% reduction previously described. Similarly, table look-ups are performed at control blocks 106 and 108, where the gains $A_1$ and $A_2$ are determined, respectively, based on vehicle speed. The gain $A_2$ is corrected (i.e. reduced by approximately 20%) at control block 110. The controller then determines the desired rear wheel angle (°) according to the transfer function G(s) (previously described) by summing the value from control block 110 with the values from the multipliers 112 and 114. Control block 116 converts the desired rear wheel angle from degrees to a desired rear rack position (mm). The desired rear rack position is limited, at control block 118, to approximately ±6 mm. Preferably, this limit is about 20 mm for low vehicle speeds. Lastly, the controller adds the handling term from block 88 to the desired rear rack position to steer the rear steerable wheels.

Figure 16:
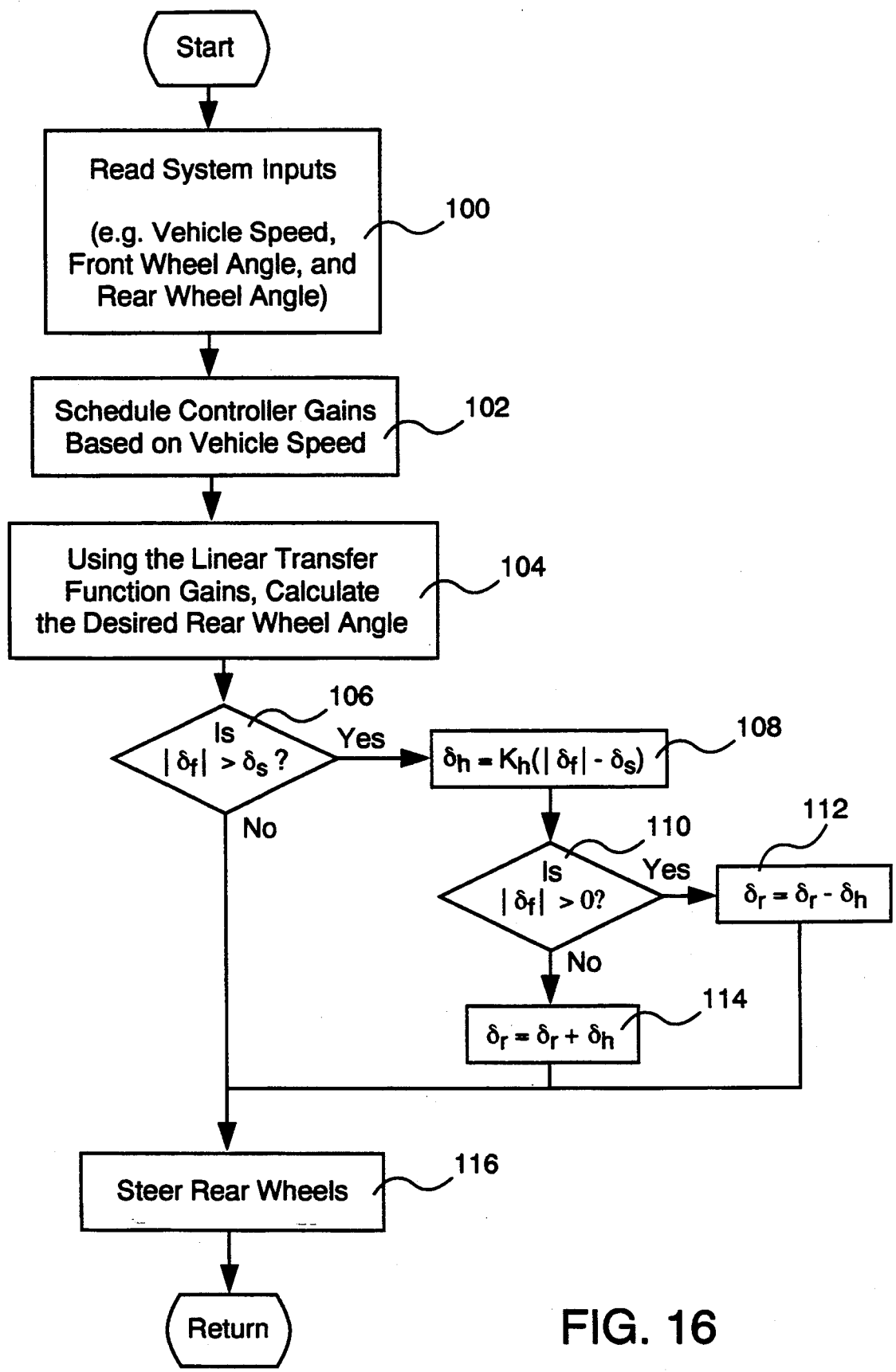
FIG. 16 is a flow chart illustrating the control strategy of the present invention.

The flow chart shown in FIG. 16 illustrates the operational steps taken by the feedforward controller of the present invention. During vehicle operation, the controller first reads system inputs, such as vehicle speed, front wheel angle and rear wheel angle utilizing a plurality of sensors, as previously described. At step 102, the controller gains $A_0$, $A_1$ and $A_2$ are determined from a look-up table stored in a ROM memory, based on vehicle speed. At step 104, the desired rear wheel angle ($\delta_r$) is calculated utilizing the linear transfer function gains.

Prior to steering the rear steerable wheels, at step 106 the controller determines whether the front wheel angle ($\delta_f$) has exceeded the tire saturation angle ($\delta_s$) at the linear limit or border (see FIG. 13). If the front wheel angle does not exceed the tire saturation angle, the controller 26, at step 116, commands the rear steerable wheels 114 toward the calculated rear wheel angle. If the front wheel angle does exceed the tire saturation angle, the tires are operating in the non-linear region (see FIG. 15). At step 108, an additional handling term ($\delta_h$) is determined by the controller by subtracting the entire saturation angle from the front wheel angle and multiplying that result by a handling gain ($K_h$). At step 110, the controller determines if the front wheel angle is greater than zero to determine whether the additional handling term should be added to or subtracted from the calculated rear wheel angle ($\delta_r$). If the front wheel angle is greater than zero, at step 112, the additional angle is subtracted from the rear wheel angle. If, however, the front wheel angle is less than zero, the additional handling term is added to the rear wheel angle determined at step 104. The rear steerable wheels are then steering toward this rear wheel angle ($\delta_r$) at step 116. By steering the rear steerable wheels back toward the center or out-of-phase for severe corners, the feedforward controller emulates the operation of the CLYR controller during vehicle operation in the non-linear region.

It is understood, of course, that while the form of the invention herein shown and described constitutes the preferred embodiment of the invention, it is not intended to illustrate all possible forms thereof. It will also be understood that the words used are words of description rather than limitation, and that various changes may be made without departing from the spirit and scope of the invention disclosed.

We claim:

1. A method of improving vehicle handling for use with a road vehicle having at least one front steerable wheel and at least one rear steerable wheel, one of the steerable wheels being manually operable and the other being electronically controlled, the front and rear steerable wheels each including a tire, said tires having substantially similar physical traction properties at the tire-road interface which define a linear region of operation and a nonlinear region of operation in a relationship of tire slip angle to lateral tire force, the method comprising:

steering the rear steerable wheel to a desired rear steer angle based on vehicle speed and front wheel angle, during vehicle operation in the nonlinear region of the front tire; and calculating the desired rear steer angle during vehicle operation in the linear region of the front tire utilizing a controller having the transfer function:

$$\frac{d_r(s)}{d_f(s)} = A_0 H_1(s) + A_1 H_2(s) H_1(s) + A_2 H_2^2(s) H_1(s)$$

wherein $A_0$, $A_1$ and $A_2$ represent gains based on vehicle speed, $H_1(s)$ represents a low pass filter and $H_2(s)$ represents a high pass filter, $d_r(s)/d_f(s)$ representing an output response of the rear wheel to a given change in input steer angle for the front wheel.

2. The method of claim 1 wherein the rear steerable wheel is steered toward out-of-phase with the front steerable wheel during vehicle operation in the nonlinear region of the front tire.

3. A method of improving vehicle handling for use with a vehicle having manually operable front steerable wheels and electronically controlled rear steerable wheels, the front and rear steerable wheels each including a tire, the method comprising:

calculating a desired rear steer angle based on vehicle speed and front wheel angle;

determining if the vehicle is operating in a nonlinear region of the front tires;

calculating a handling term if the vehicle is operating in the nonlinear region of the front tires;

modifying the desired rear steer angle based on the handling term; and steering the rear steerable wheels toward the modified desired rear steer angle, wherein the desired rear steer angle is calculated during operation in a linear region of the tires utilizing a controller having the transfer function:

$$\frac{d_r(s)}{d_f(s)} = A_0 H_1(s) + A_1 H_2(s) H_1(s) + A_2 H_2^2(s) H_1(s)$$

wherein $A_0$, $A_1$ and $A_2$ represent gains based on vehicle speed, $H_1(s)$ represents a low pass filter and $H_2(s)$ represents a high pass filter, $d_r(s)/d_f(s)$ representing an output response of the rear wheels to a given change in input steer angle for the front wheels.

4. A method of improving vehicle handling for use with a vehicle having a pair of front steerable wheels and a pair of rear steerable wheels, one of the pairs of steerable wheels being manually operable and the other being electronically controlled, the front and rear steerable wheels each including a tire, each tire having a substantially similar physical characteristic which defines a linear region of operation and a nonlinear region of operation, the method comprising:

steering the rear steerable wheels to a desired rear steer angle based on vehicle speed and front wheel angle, during vehicle operation in the nonlinear region of the front tires; and calculating the desired rear steer angle during vehicle operation in the linear region of the front tires utilizing a controller having the transfer function:

$$\frac{d_r(s)}{d_f(s)} = A_0 H_1(s) + A_1 H_2(s) H_1(s) + A_2 H_2^2(s) H_1(s)$$

wherein $A_0$, $A_1$ and $A_2$ represent gains based on vehicle speed, $H_1(s)$ represents a low pass filter and $H_2(s)$ represents a high pass filter, $d_r(s)/d_f(s)$ representing an output response of the rear wheels to a given change in input steer angle for the front wheels.

5. The method of claim 4 wherein the rear steerable wheels are steered in proportion to the front steerable wheels for vehicle speeds of about 25 miles per hour or less.

6. The method of claim 4 wherein the rear steerable wheels are electronically controlled.

7. The method of claim 4 wherein the rear steerable wheels are steered toward out-of-phase with the front steerable wheels during vehicle operation in the nonlinear region of the front tires.

8. An apparatus for improving vehicle handling for use with a road vehicle having at least one front steerable wheel and at least one rear steerable wheel;

one of the steerable wheels being manually operable and the other being electronically controlled, the front and rear steerable wheels each including a tire;

said tires having substantially common physical traction properties at a tire-road interface for each tire which define a linear region of operation and a nonlinear region of operation in a relationship of tire slip angle to lateral tire force, a controller adapted to steer the rear steerable wheel to a desired rear steer angle based on vehicle speed and front wheel angle during vehicle operation in the nonlinear region of the front tire, the controller having the transfer function:

$$\frac{d_r(s)}{d_f(s)} = A_0 H_1(s) + A_1 H_2(s) H_1(s) + A_2 H_2^2(s) H_1(s)$$

wherein $A_0$, $A_1$ and $A_2$ represent gains based on vehicle speed, $H_1(s)$ represents a low pass filter and $H_2(s)$ represents a high pass filter, $d_r(s)/d_f(s)$ representing an output response of the rear wheels to a given change in input steer angle for the front wheels.

9. The apparatus of claim 8 wherein the rear steerable wheel is steered toward out-of-phase with the front steerable wheel during operation in the nonlinear region of the front tire.

10. An apparatus for improving vehicle handling for use with a vehicle having at least one front steerable wheel and at least one rear steerable wheel, one of the steerable wheels being manually operable and the other being electronically controlled, the front and rear steerable wheels each including a tire, each tire having a substantially similar physical characteristic which defines a linear region of operation and a nonlinear region of operation, the apparatus comprising:

control means for steering the at least one rear steerable wheel to a desired rear steer angle based on vehicle speed and front wheel angle, during vehicle operation in the nonlinear region of the at least one front tire;

the vehicle including a pair of front steerable wheels and a pair of rear steerable wheels, the front and rear steerable wheels each including a tire, each tire having a substantially similar physical characteristic which defines a linear region of operation and a nonlinear region of operation, and wherein the control means is a controller, utilized during operation in the linear region of front tires, having a transfer function:

$$\frac{d_r(s)}{d_f(s)} = A_0 H_1(s) + A_1 H_2(s) H_1(s) + A_2 H_2^2(s) H_1(s)$$

wherein $A_0$, $A_1$ and $A_2$ represent gains based on vehicle speed, $H_1(s)$ represents a low pass filter and $H_2(s)$ represents a high pass filter, $d_r(s)/d_f(s)$ representing an output response of the rear wheels to a given change in input steer angle for the front wheels.

11. The apparatus of claim 10 wherein the rear steerable wheels are steered toward out-of-phase with the front steerable wheels during operation in the nonlinear region of the front tires.

* * * * *